(12) United States Patent
Kumar et al.

(10) Patent No.: US 11,576,203 B2
(45) Date of Patent: Feb. 7, 2023

(54) RANDOM ACCESS CHANNEL CONFIGURATION

(71) Applicant: QUALCOMM Incorporated, San Diego, CA (US)

(72) Inventors: Satish Kumar, Hyderabad (IN); Loksiva Paruchuri, Hyderabad (IN); Ashok Kumar Tripathi, Pragathi Enclave (IN)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/952,784

(22) Filed: Nov. 19, 2020

(65) Prior Publication Data
US 2022/0159714 A1    May 19, 2022

(51) Int. Cl.
*H04W 74/00* (2009.01)
*H04W 72/04* (2009.01)
*H04W 74/08* (2009.01)

(52) U.S. Cl.
CPC ..... *H04W 74/008* (2013.01); *H04W 72/0446* (2013.01); *H04W 72/0453* (2013.01); *H04W 74/085* (2013.01)

(58) Field of Classification Search
None
See application file for complete search history.

(56) References Cited

U.S. PATENT DOCUMENTS

| | | | |
|---|---|---|---|
| 2012/0052855 A1* | 3/2012 | Soliman | H04W 56/0025 455/422.1 |
| 2012/0289178 A1* | 11/2012 | Matsumura | H04W 52/0206 455/403 |
| 2014/0328309 A1* | 11/2014 | Comstock | H04W 72/082 370/329 |
| 2016/0205604 A1* | 7/2016 | Kang | H04W 74/0833 370/331 |
| 2016/0338109 A1* | 11/2016 | Rahman | H04W 56/005 |
| 2017/0273056 A1* | 9/2017 | Papasakellariou | H04W 72/042 |
| 2020/0045735 A1* | 2/2020 | Kim | H04W 52/36 |

* cited by examiner

*Primary Examiner* — Jay L Vogel
(74) *Attorney, Agent, or Firm* — Harrity & Harrity, LLP

(57) ABSTRACT

Various aspects of the present disclosure generally relate to wireless communication. In some aspects, a base station may determine, based at least in part on a configuration of a first random access channel associated with a macro cell, one or more parameters of a configuration of a second random access channel associated with a small cell provided by the base station. The base station may transmit an indication of the one or more parameters of the configuration of the second random access channel. Numerous other aspects are provided.

30 Claims, 6 Drawing Sheets

RANDOM ACCESS CHANNEL CONFIGURATION

FIELD OF THE DISCLOSURE

Aspects of the present disclosure generally relate to wireless communication and to techniques and apparatuses for random access channel configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station includes determining, based at least in part on a configuration of a first random access channel (RACH) associated with a macro cell, one or more parameters of a configuration of a second RACH associated with a small cell provided by the base station; and transmitting an indication of the one or more parameters of the configuration of the second RACH.

In some aspects, a base station for wireless communication includes a memory; and one or more processors operatively coupled to the memory, the memory and the one or more processors configured to: determine, based at least in part on a configuration of a first RACH associated with a macro cell, one or more parameters of a configuration of a second RACH associated with a small cell provided by the base station; and transmit an indication of the one or more parameters of the configuration of the second RACH.

In some aspects, a non-transitory computer-readable medium storing a set of instructions for wireless communication includes one or more instructions that, when executed by one or more processors of a base station, cause the base station to: determine, based at least in part on a configuration of a first RACH associated with a macro cell, one or more parameters of a configuration of a second RACH associated with a small cell provided by the base station; and transmit an indication of the one or more parameters of the configuration of the second RACH.

In some aspects, an apparatus for wireless communication includes means for determining, based at least in part on a configuration of a first RACH associated with a macro cell, one or more parameters of a configuration of a second RACH associated with a small cell provided by the apparatus; and means for transmitting an indication of the one or more parameters of the configuration of the second RACH.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
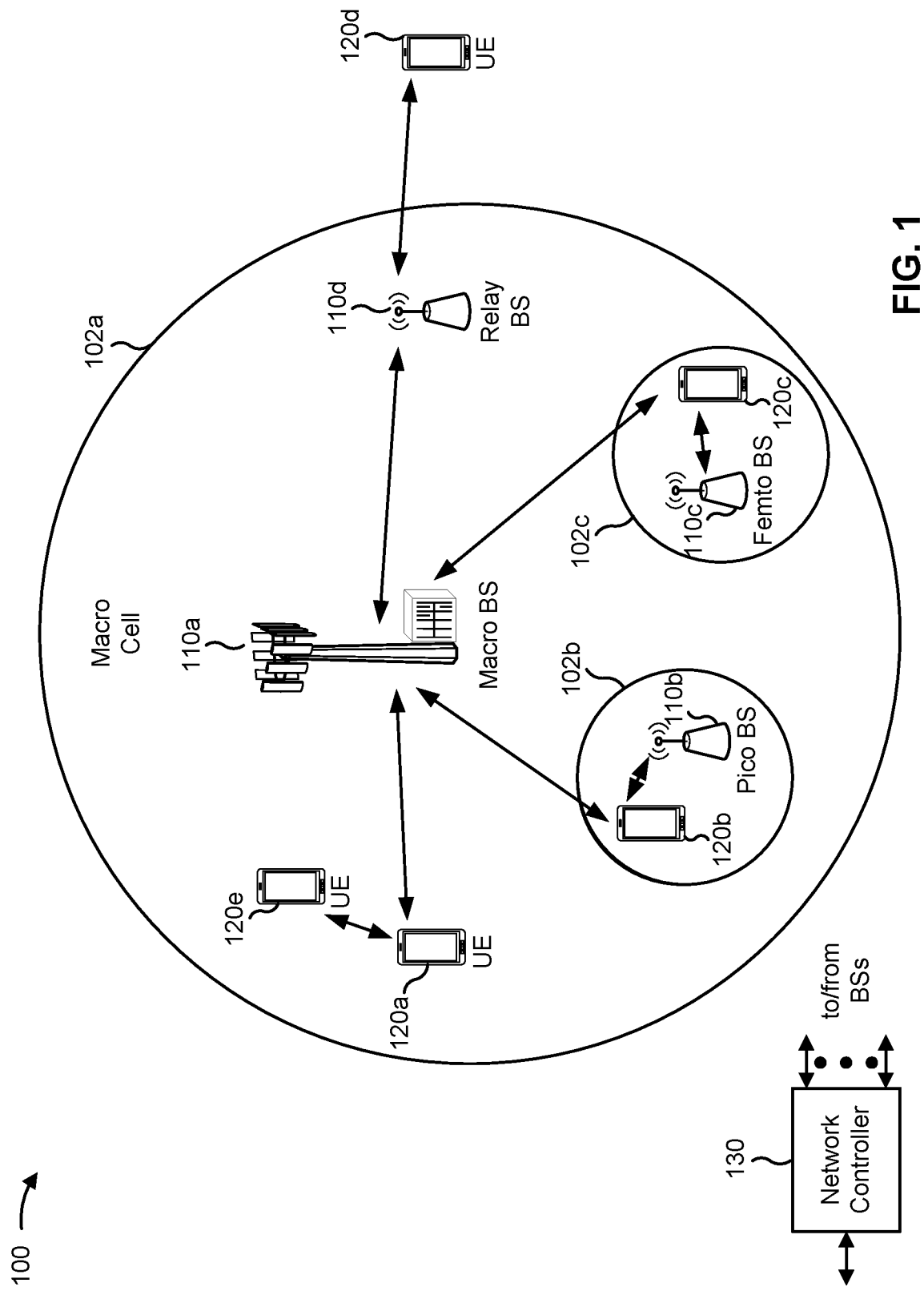
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell, (e.g., a small cell) may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
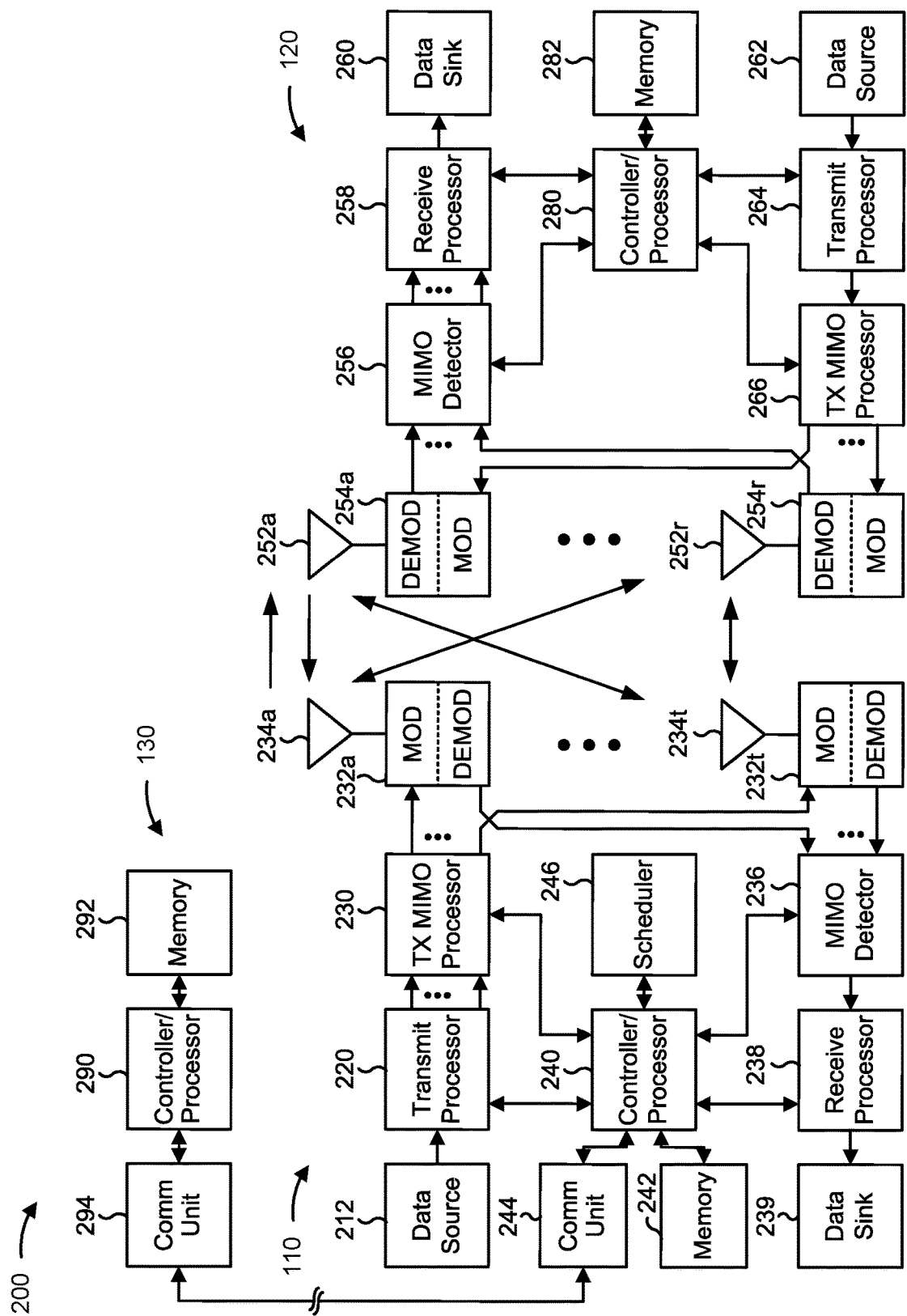
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4 and 5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4 and 5.

Controller/processor 240 of base station 110, controller/processor 280 of UE 120, and/or any other component(s) of FIG. 2 may perform one or more techniques associated with random access channel (RACH) configuration, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some aspects, executing instructions may include running the instructions, converting the instructions, compiling the instructions, and/or interpreting the instructions, among other examples.

In some aspects, the base station includes means for determining, based at least in part on a configuration of a first RACH associated with a macro cell, one or more parameters of a configuration of a second RACH associated with a small cell provided by the base station; or means for transmitting an indication of the one or more parameters of the configuration of the second RACH. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for determining the one or more parameters to reduce one or more of collisions or interference with the first RACH.

In some aspects, the base station includes means for determining the configuration of the first RACH based at least in part on performance of a network listen operation.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
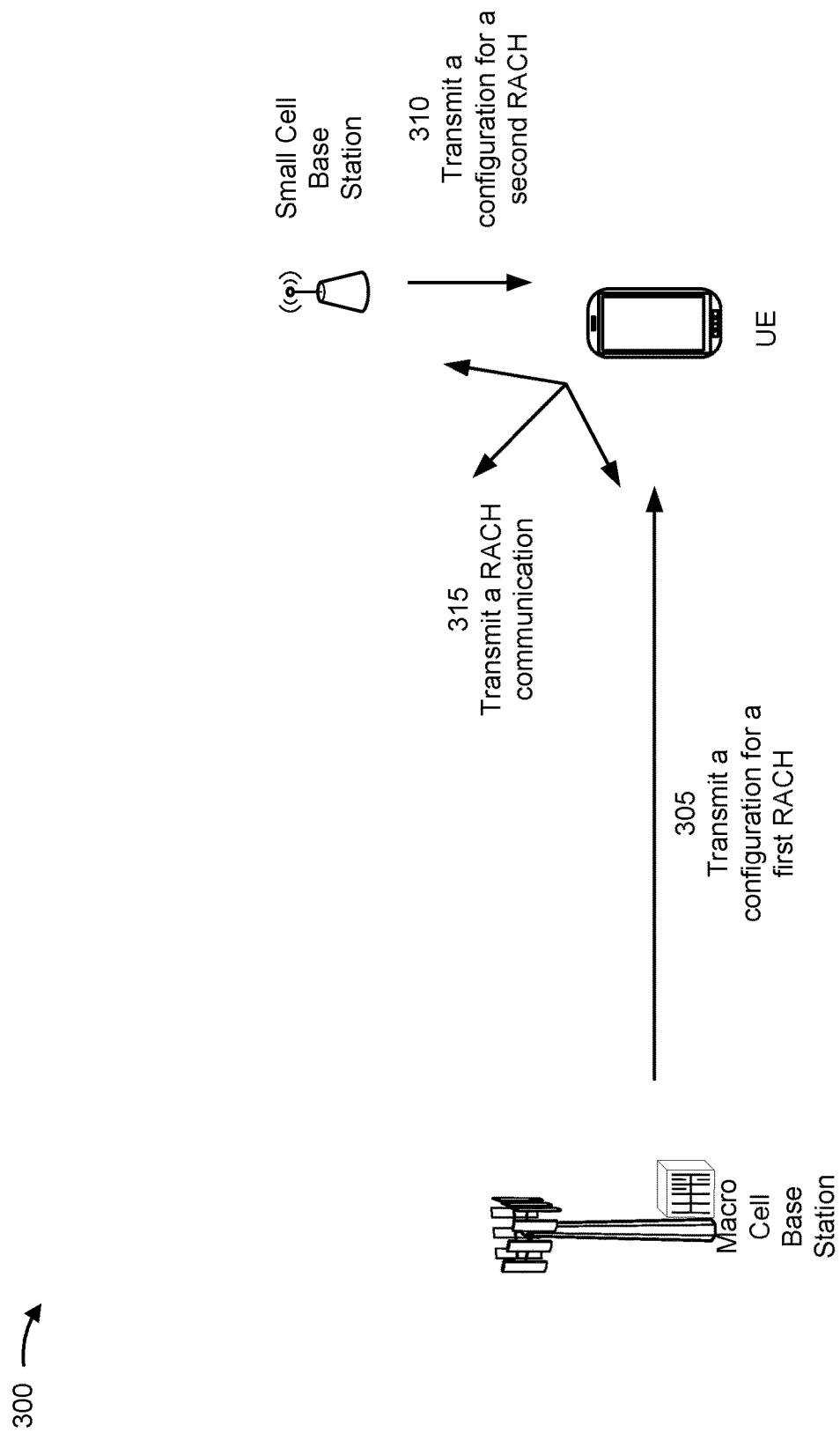
FIG. 3 is a diagram illustrating an example of a random access channel communication, in accordance with various aspects of the present disclosure.

FIG. 3 is a diagram illustrating an example of an RACH communication, in accordance with various aspects of the present disclosure. As shown in FIG. 3, a UE may be within coverage range of a macro cell base station and a small cell base station. The macro cell base station may provide a macro cell and the small cell base station may provide a small cell (e.g., a cell having a relatively small range, such as 50 meters, 100 meters, or 200 meters, among other examples).

As shown by reference number 305, the macro cell base station may transmit a configuration for a first RACH that is associated with the macro cell. The configuration may indicate one or more parameters for the first RACH, such as frequency resources, time domain resources, a format dimension, and/or a transmit power for a UE to use to transmit a RACH communication (e.g., a message 1 communication).

As shown by reference number 310, the small cell base station may transmit a configuration for a second RACH that is associated with the small cell. The configuration may indicate one or more parameters for the first RACH, such as frequency resources, time domain resources, a format dimension, and/or a transmit power for a UE to use to transmit a RACH communication (e.g., a message 1 communication).

Resources configured for the first RACH and resources configured for the second RACH may be the same and/or may overlap. For example, the configuration for the first RACH may use a first frequency bandwidth part and the configuration for the second RACH may use a second frequency bandwidth part that may be the same frequency bandwidth part as the first frequency bandwidth part and/or may share resources with the first frequency bandwidth part. Additionally, or alternatively, the configuration for the first RACH may use a first time domain resource (e.g., a slot or a subslot, among other examples) and the configuration for the second RACH may use a second time domain resource that may be the same time domain resource as the first time domain resource and/or may share time domain resources with the first time domain resource.

As shown by reference number 315, the UE may transmit a RACH communication. The UE may intend the RACH communication for the small cell base station or for the macro cell base station.

However, if the configuration for the first RACH and the configuration for the second RACH use the same resources, both of the small cell base station and the macro cell base station may receive the RACH communication. For example, the macro cell base station may unintentionally receive a RACH communication that is intended for the small cell base station and not for the macro cell base station (e.g., a false RACH communication). A RACH procedure may be an open and random procedure (e.g., with the UE selecting a preamble), so the macro cell base station may be unaware that the RACH communication is a false RACH communication. Based at least in part on the macro cell base station being unaware that the RACH communication is a false RACH communication, the macro cell base station may schedule additional resources for subsequent RACH communications (e.g., a message 2 and/or a message 3, among other examples) with the UE.

This may consume computing, network, communication, and/or power resources to schedule, transmit, and/or attempt to receive the subsequent RACH communications that the UE does not intend to send or receive. In some networks, multiple small cell base stations may be within coverage range of the macro cell base station, which may result in multiple false RACH communications and may multiply an amount of consumed computing, network, communication, and/or power resources.

As indicated above, FIG. 3 is provided as an example. Other examples may differ from what is described with regard to FIG. 3.

In some aspects described herein, a small cell base station may determine one or more parameters of a configuration of a small cell RACH based at least in part on a configuration of a macro cell RACH associated with a macro cell (e.g., a cell provided by a macro cell base station). In some aspects, the small cell base station may determine the configuration of the macro cell RACH based at least in part on performing a network listen operation that includes scanning one or more frequency ranges to detect the macro cell. The network listen operation may also include detecting an indication of a configuration of the macro cell RACH based at least in part on, for example, receiving a system information block (SIB) and/or master information block (MIB) associated with the macro cell RACH.

In some aspects, the small cell base station may determine the one or more parameters of the configuration of the small cell RACH to include RACH (e.g., physical RACH (PRACH)) frequency domain resources that are different from frequency domain resources of the macro cell RACH.

In some aspects, the small cell base station may determine the one or more parameters of the configuration of the small cell RACH to include a RACH (e.g., PRACH) configuration index associated with time domain resources (e.g., slots) that are different from time domain resources associated with the macro cell RACH.

In some aspects, the small cell base station may determine the one or more parameters of the configuration of the small cell RACH to include a transmission power (e.g., a PRACH transmission power) that is a reduced transmission power (e.g., with a relatively low preamble received target power). In some aspects, the small cell base station may select a RACH format that indicates to transmit a RACH sequence with repetitions (e.g., 1 or more repetitions in addition to an original RACH sequence transmission). In some aspects, the RACH format may indicate a higher number of repetitions than a RACH format of the macro cell RACH. In this way, the small cell base station may receive the RACH communication based at least in part on aggregating the repetitions transmitted with a reduced transmission power, and the macro cell base station may have a reduced likelihood of receiving the RACH communication based at least in part on the reduced transmission power and/or the macro cell base station being unaware of the configuration of repetitions.

Based at least in part on the small cell base station determining or more parameters of the configuration of the small cell RACH based at least in part on the configuration of the macro cell RACH, the small cell base station may select the one or more parameters to reduce collisions and/or interference with RACH communications for the macro cell and/or may reduce false RACH communications. In this way, the macro cell base station may conserve computing, network, communication, and/or power resources that may otherwise have been used to schedule, transmit, and/or attempt to receive the subsequent RACH communications that the UE does not intend to send or receive.

Figure 4:
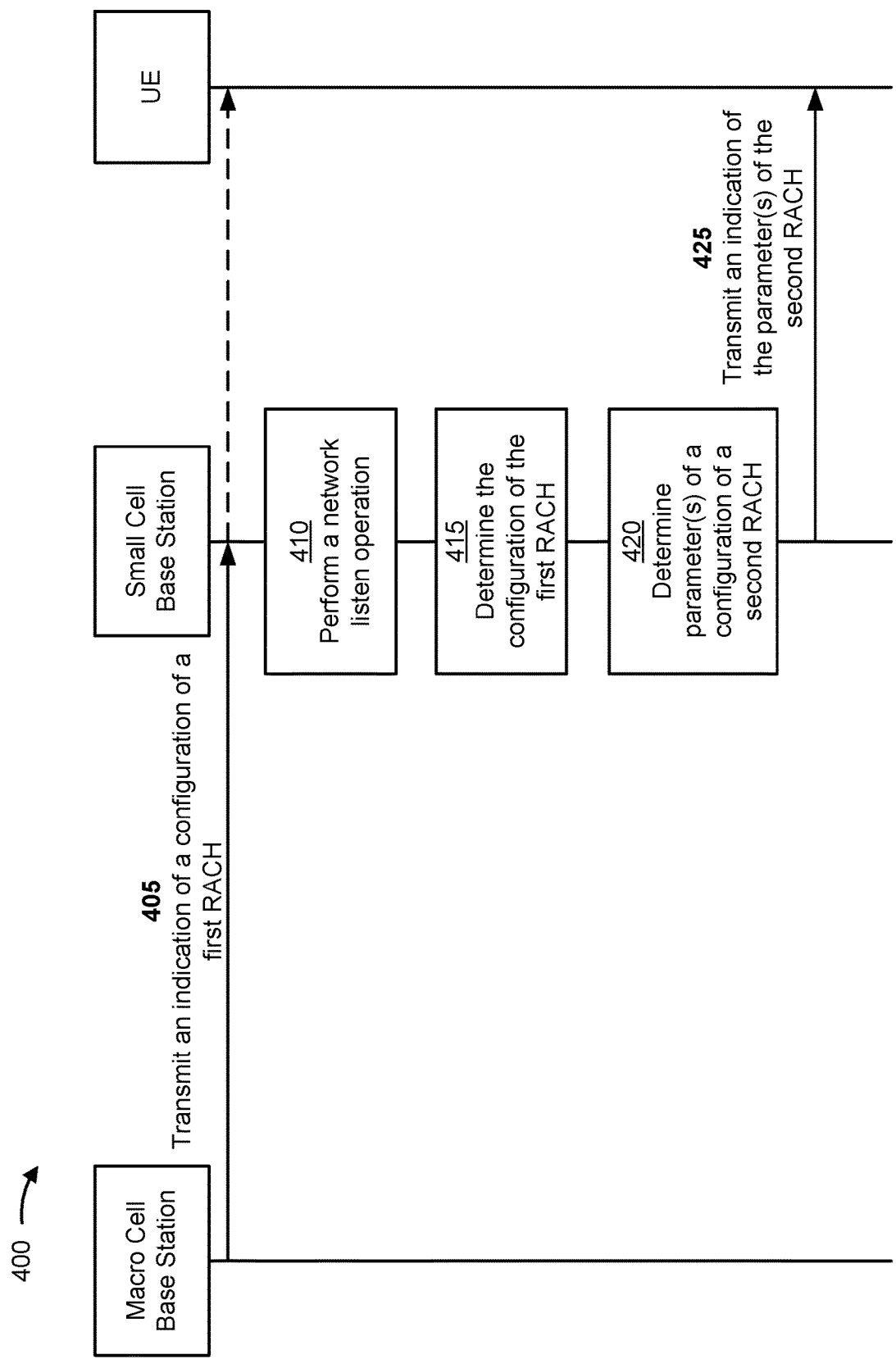
FIG. 4 is a diagram illustrating an example associated with random access channel configuration, in accordance with various aspects of the present disclosure.

FIG. 4 is a diagram illustrating an example associated with RACH configuration, in accordance with various aspects of the present disclosure. As shown in FIG. 4, a UE (e.g., UE 120) may be within a coverage range of a macro cell base station (e.g., base station 110) and/or a small cell base station (e.g., base station 110). In some aspects, the UE, the macro cell base station, and the small cell base station may be part of one or more wireless networks (e.g., wireless network 100).

As shown by reference number 405, the macro cell base station may transmit, and the small cell base station and/or the UE may receive, an indication of a configuration of a first RACH associated with the macro cell base station. In some aspects, the macro cell base station may transmit the indication within a SIB and/or a MIB that indicates a configuration of the first RACH. In some aspects, the macro cell base station may broadcast the indication.

As shown by reference number 410, the small cell base station may perform a network listen operation. In some aspects, the network listen operation may include a scan of one or more frequency ranges to detect the macro cell. For example, the network listen operation may include detecting one or more SIBs associated with the macro cell. The network listen operation may also include a determination of a configuration of the first RACH (e.g., based at least in part on an indication in the one or more SIBs).

As shown by reference number 415, the small cell base station may determine the configuration of the first RACH associated with the macro cell base station. In some aspects, the small cell base station may determine the configuration of the first RACH based at least in part on performing the network listen operation.

As shown by reference number 420, the small cell base station may determine one or more parameters of a configuration of a second RACH associated with the small cell base station. In some aspects, the small cell base station may determine the one or more parameters based at least in part on the configuration of the first RACH. For example, the small cell base station may determine the one or more parameters to reduce one or more of collisions or interference with the first RACH.

In some aspects, the one or more parameters may include a first set of frequency resources for the second RACH, a first set of time-domain resources for the second RACH, a first RACH format for the second RACH, and/or a first transmission power for the second RACH, among other examples. In some aspects, the first RACH format may indicate one or more time domain resources and/or a repetition number for transmitting a RACH communication to the small cell base station In some aspects, the first set of frequency resources is different from a second set of frequency resources configured for the first RACH. In some aspects, the first set of time-domain resources is different from a second set of time-domain resources configured for the first RACH. In some aspects, the first RACH format is different from a second RACH format configured for the first RACH. In some aspects, the first transmission power is a reduced transmission power.

In some aspects, the one or more parameters include the first transmission power and the RACH format, with the first transmission power being a reduced transmission power and the RACH format indicating to transmit a RACH with repetitions. For example, based at least in part on the configuration of the macro cell RACH indicating a format C0, the small cell base station may select a format that includes more than one repetition. Based at least in part on the small cell base station selecting format A1 or A1B1, a preamble received target power may be reduced by 3 decibels. Based at least in part on the small cell base station selecting format A2, C2, or A2B2, a preamble received target power may be reduced by 6 decibels. Based at least in part on the small cell base station selecting format A3 or A3B3, a preamble received target power may be reduced by 8 decibels. Based at least in part on the small cell base station selecting format B4, a preamble received target power may be reduced by 10 decibels.

As shown by reference number 425, the small cell base station may transmit, and the UE may receive, an indication of the one or more parameters of the second RACH. In some aspects, the small cell base station may transmit the indication within a SIB and/or a MIB that indicates a configuration of the second RACH. In some aspects, the small cell base station may broadcast the indication.

Based at least in part on the small cell base station determining one or more parameters of the configuration of the second RACH based at least in part on the configuration of the first RACH, the small cell base station may select the one or more parameters to reduce collisions and/or interference with RACH communications for the macro cell and/or may reduce false RACH communications received by the macro cell. In this way, the macro cell base station may conserve computing, network, communication, and/or power resources that may otherwise have been used to schedule, transmit, and/or attempt to receive the subsequent RACH communications that the UE does not intend to send or receive.

As indicated above, FIG. 4 is provided as an example. Other examples may differ from what is described with regard to FIG. 4.

Figure 5:
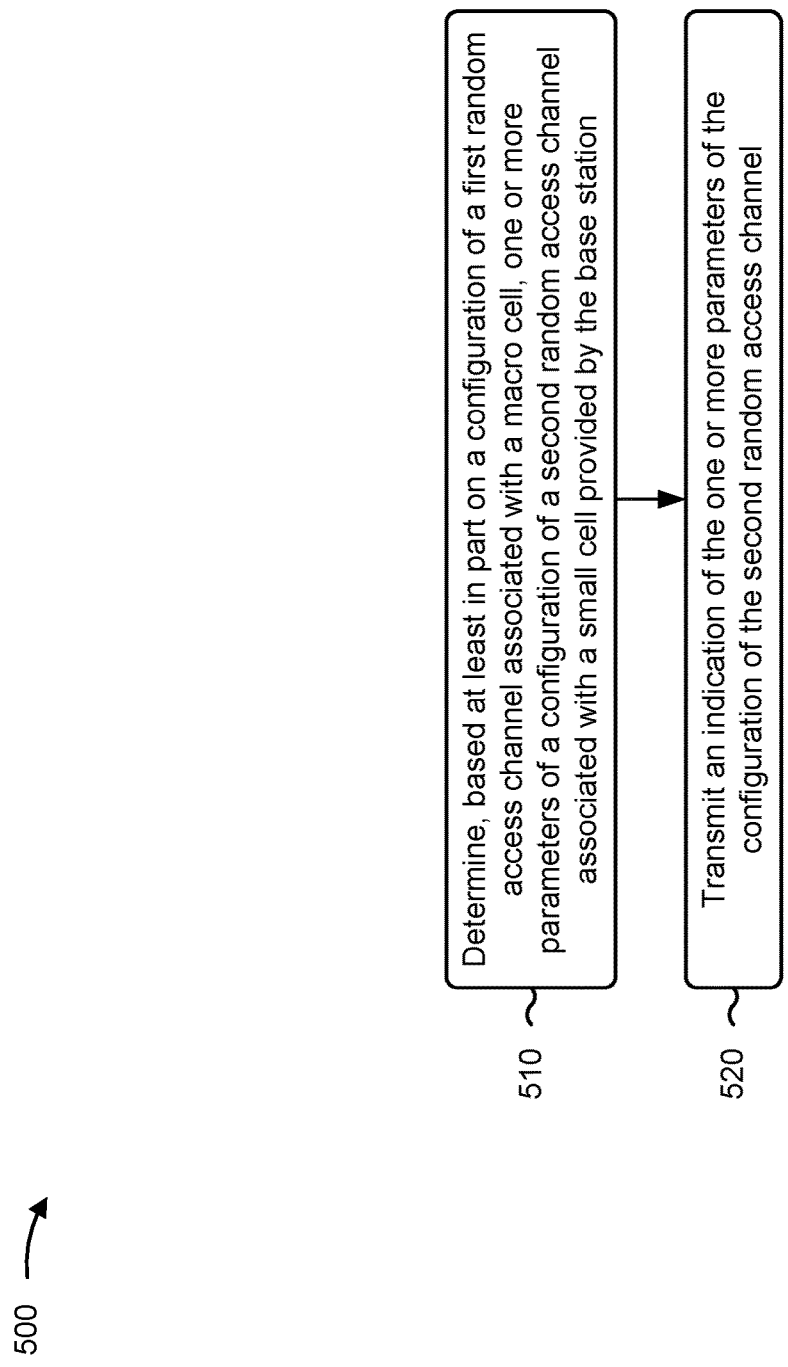
FIG. 5 is a diagram illustrating an example process associated with random access channel configuration, in accordance with various aspects of the present disclosure.

FIG. 5 is a diagram illustrating an example process 500 performed, for example, by a base station, in accordance with various aspects of the present disclosure. Example process 500 is an example where the base station (e.g., base station 110) performs operations associated with RACH configuration.

As shown in FIG. 5, in some aspects, process 500 may include determining, based at least in part on a configuration of a first RACH associated with a macro cell, one or more parameters of a configuration of a second RACH associated with a small cell provided by the base station (block 510). For example, the base station (e.g., using determination component 608, depicted in FIG. 6) may determine, based at least in part on a configuration of a first RACH associated with a macro cell, one or more parameters of a configuration of a second RACH associated with a small cell provided by the base station, as described above.

As further shown in FIG. 5, in some aspects, process 500 may include transmitting an indication of the one or more parameters of the configuration of the second RACH (block 520). For example, the base station (e.g., using transmission component 604, depicted in FIG. 6) may transmit an indication of the one or more parameters of the configuration of the second RACH, as described above.

Process 500 may include additional aspects, such as any single aspect or any combination of aspects described below and/or in connection with one or more other processes described elsewhere herein.

In a first aspect, determining the one or more parameters of the configuration of the second RACH comprises determining the one or more parameters to reduce one or more of collisions or interference with the first RACH.

In a second aspect, alone or in combination with the first aspect, process 500 includes determining the configuration of the first RACH based at least in part on performance of a network listen operation.

In a third aspect, alone or in combination with one or more of the first and second aspects, the network listen operation comprises a scan of one or more frequency ranges to detect the macro cell, and a determination of a configuration of the first RACH.

In a fourth aspect, alone or in combination with one or more of the first through third aspects, the one or more parameters comprise a first set of frequency resources for the second RACH, wherein the first set of frequency resources is different from a second set of frequency resources configured for the first RACH.

In a fifth aspect, alone or in combination with one or more of the first through fourth aspects, the one or more parameters comprise a first set of time-domain resources for the second RACH, wherein the first set of time-domain resources is different from a second set of time-domain resources configured for the first RACH.

In a sixth aspect, alone or in combination with one or more of the first through fifth aspects, the one or more parameters comprise a first RACH format for the second RACH, wherein the first RACH format is different from a second RACH format configured for the first RACH.

In a seventh aspect, alone or in combination with one or more of the first through sixth aspects, the one or more parameters comprise a first transmission power for the second RACH, wherein the first transmission power is a reduced transmission power.

In an eighth aspect, alone or in combination with one or more of the first through seventh aspects, the one or more parameters comprise a RACH format for the second RACH, wherein the RACH format indicates to transmit a RACH communication with repetitions.

In a ninth aspect, alone or in combination with one or more of the first through eighth aspects, the first transmission power is associated with a preamble received target power parameter.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
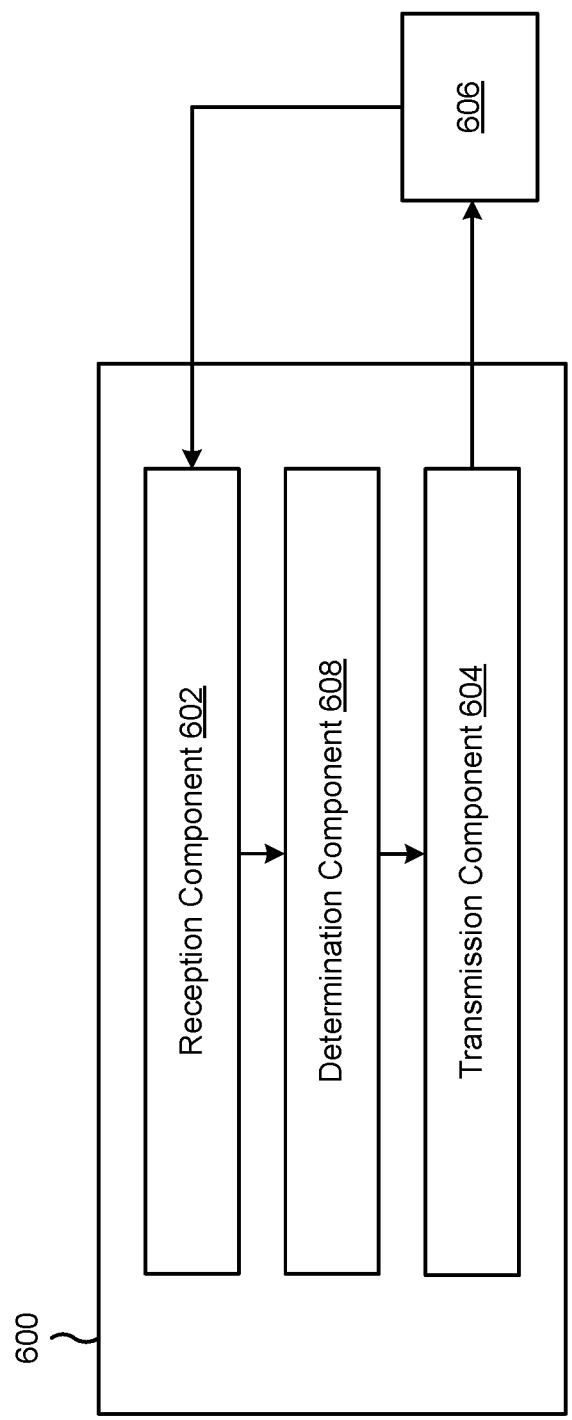
FIG. 6 is a block diagram of an example apparatus for wireless communication, in accordance with various aspects of the present disclosure.

FIG. 6 is a block diagram of an example apparatus 600 for wireless communication. The apparatus 600 may be a base station, or a base station may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a determination component 608.

In some aspects, the apparatus 600 may be configured to perform one or more operations described herein in connection with FIG. 5. Additionally, or alternatively, the apparatus 600 may be configured to perform one or more processes described herein, such as process 500 of FIG. 5. In some aspects, the apparatus 600 and/or one or more components shown in FIG. 6 may include one or more components of the base station described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the base station described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the base station described above in connection with FIG. 2. In some aspects, the transmission component 604 may be co-located with the reception component 602 in a transceiver.

The determination component 608 may determine, based at least in part on a configuration of a first RACH associated with a macro cell, one or more parameters of a configuration of a second RACH associated with a small cell provided by the base station. The transmission component 604 may transmit an indication of the one or more parameters of the configuration of the second RACH.

The determination component 608 may determine the configuration of the first RACH based at least in part on performance of a network listen operation.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of aspects of the present disclosure:

Aspect 1: A method of wireless communication performed by a base station, comprising: determining, based at least in part on a configuration of a first random access channel associated with a macro cell, one or more parameters of a configuration of a second random access channel associated with a small cell provided by the base station; and transmitting an indication of the one or more parameters of the configuration of the second random access channel.

Aspect 2: The method of aspect 1, wherein determining the one or more parameters of the configuration of the second random access channel comprises: determining the one or more parameters to reduce one or more of collisions or interference with the first random access channel.

Aspect 3: The method of any of aspects 1 through 2, further comprising determining the configuration of the first random access channel based at least in part on performance of a network listen operation.

Aspect 4: The method of aspect 3, wherein the network listen operation comprises: a scan of one or more frequency ranges to detect the macro cell, and a determination of a configuration of the first random access channel.

Aspect 5: The method of any of aspects 1 through 4, wherein the one or more parameters comprise: a first set of frequency resources for the second random access channel, wherein the first set of frequency resources is different from a second set of frequency resources configured for the first random access channel.

Aspect 6: The method of any of aspects 1 through 5, wherein the one or more parameters comprise: a first set of time-domain resources for the second random access channel, wherein the first set of time-domain resources is different from a second set of time-domain resources configured for the first random access channel.

Aspect 7: The method of any of aspects 1 through 6, wherein the one or more parameters comprise: a first random access channel format for the second random access channel, wherein the first random access channel format is different from a second random access channel format configured for the first random access channel.

Aspect 8: The method of any of aspects 1 through 7, wherein the one or more parameters comprise: a first transmission power for the second random access channel, wherein the first transmission power is a reduced transmission power.

Aspect 9: The method of any of aspects 1 through 8, wherein the one or more parameters comprise: a random access channel format for the second random access channel, wherein the random access channel format indicates to transmit a random access channel communication with repetitions.

Aspect 10: An apparatus for wireless communication at a first device, comprising a processor; memory coupled with the processor; and instructions stored in the memory and executable by the processor to cause the apparatus to perform a method of any of aspects 1 through 9.

Aspect 11: An apparatus for wireless communication at a first device, comprising at least one means for performing a method of any of aspects 1 through 9.

Aspect 12: A non-transitory computer-readable medium storing code for wireless communication at a first device, the code comprising instructions executable by a processor to perform a method of any of aspects 1 through 9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network entity, comprising:
    performing a network listen operation;
    determining, based at least in part on the network listen operation and based at least in part on a configuration of a first random access channel (RACH) associated with a macro cell, one or more parameters of a configuration of a second RACH associated with a small cell provided by the network entity,
        wherein a first RACH format configured for the first RACH is different from a second RACH format configured for the second RACH,
        wherein the one or more parameters include the second RACH format, and
        wherein the second RACH format indicates a higher quantity of repetitions than the first RACH format and a reduced transmission power;
    transmitting an indication of the one or more parameters of the configuration of the second RACH; and
    receiving a RACH communication based at least in part on repetitions, of a RACH sequence associated with the second RACH format and with the reduced transmission power, being aggregated.

2. The method of claim 1, wherein determining the one or more parameters of the configuration of the second RACH comprises:
determining the one or more parameters to reduce one or more of collisions or interference with the first RACH.

3. The method of claim 1, further comprising:
determining the configuration of the first RACH based at least in part on the network listen operation.

4. The method of claim 3, wherein the network listen operation comprises:
a scan of one or more frequency ranges to detect the macro cell, and
a determination of the configuration of the first RACH.

5. The method of claim 1, wherein the one or more parameters comprise:
a first set of frequency resources for the second RACH, wherein the first set of frequency resources is different from a second set of frequency resources configured for the first RACH.

6. The method of claim 1, wherein the one or more parameters comprise:
a first set of time-domain resources for the second RACH, wherein the first set of time-domain resources is different from a second set of time-domain resources configured for the first RACH.

7. The method of claim 1, wherein the reduced transmission power is associated with a preamble received target power parameter.

8. The method of claim 1, wherein performing the network listen operation comprises:
detecting an indication of the configuration of the first RACH based at least in part on one or more of a system information block or a master information block associated with the first RACH.

9. The method of claim 1, wherein the second RACH format indicates to transmit a RACH sequence with one or more repetitions.

10. A network entity for wireless communication, comprising:
a memory; and
one or more processors coupled to the memory, wherein the one or more processors are configured to:
perform a network listen operation;
determine, based at least in part on the network listen operation and based at least in part on a configuration of a first random access channel (RACH) associated with a macro cell, one or more parameters of a configuration of a second RACH associated with a small cell provided by the network entity,
wherein a first RACH format configured for the first RACH is different from a second RACH format configured for the second RACH,
wherein the one or more parameters include the second RACH format, and
wherein the second RACH format indicates a higher quantity of repetitions than the first RACH format and a reduced transmission power;
transmit an indication of the one or more parameters of the configuration of the second RACH; and
receive a RACH communication based at least in part on repetitions, of a RACH sequence associated with the second RACH format and with the reduced transmission power, being aggregated.

11. The network entity of claim 10, wherein the one or more processors, to determine the one or more parameters of the configuration of the second RACH, are configured to:
determine the one or more parameters to reduce one or more of collisions or interference with the first RACH.

12. The network entity of claim 10, wherein the one or more processors are further configured to:
determine the configuration of the first RACH based at least in part on the network listen operation.

13. The network entity of claim 12, wherein the network listen operation comprises:
a scan of one or more frequency ranges to detect the macro cell, and
a determination of the configuration of the first RACH.

14. The network entity of claim 10, wherein the one or more parameters comprise:
a first set of frequency resources for the second RACH, wherein the first set of frequency resources is different from a second set of frequency resources configured for the first RACH.

15. The network entity of claim 10, wherein the one or more parameters comprise:
a first set of time-domain resources for the second RACH, wherein the first set of time-domain resources is different from a second set of time-domain resources configured for the first RACH.

16. The network entity of claim 10, wherein the reduced transmission power is associated with a preamble received target power parameter.

17. The network entity of claim 10, wherein the one or more processors, to perform the network listen operation, are configured to:
detect an indication of the configuration of the first RACH based at least in part on one or more of a system information block or a master information block associated with the first RACH.

18. The network entity of claim 10, wherein the second RACH format indicates to transmit a RACH sequence with one or more repetitions.

19. A non-transitory computer-readable medium storing a set of instructions for wireless communication, the set of instructions comprising:
one or more instructions that, when executed by one or more processors of a network entity, cause the network entity to:
perform a network listen operation;
determine, based at least in part on the network listen operation and based at least in part on a configuration of a first random access channel (RACH) associated with a macro cell, one or more parameters of a configuration of a second RACH associated with a small cell provided by the network entity,
wherein a first RACH format configured for the first RACH is different from a second RACH format configured for the second RACH,
wherein the one or more parameters include the second RACH format, and
wherein the second RACH format indicates a higher quantity of repetitions than the first RACH format and a reduced transmission power;
transmit an indication of the one or more parameters of the configuration of the second RACH; and
receive a RACH communication based at least in part on repetitions, of a RACH sequence associated with the second RACH format and with the reduced transmission power, being aggregated.

20. The non-transitory computer-readable medium of claim 19, wherein the one or more instructions, that cause the network entity to determine the one or more parameters of the configuration of the second RACH, cause the network entity to:
  determine the one or more parameters to reduce one or more of collisions or interference with the first RACH.

21. The non-transitory computer-readable medium of claim 19, wherein the one or more instructions further cause the network entity to:
  determine the configuration of the first RACH based at least in part on the network listen operation.

22. The non-transitory computer-readable medium of claim 21, wherein the network listen operation comprises:
  a scan of one or more frequency ranges to detect the macro cell, and
  a determination of the configuration of the first RACH.

23. The non-transitory computer-readable medium of claim 19, wherein the one or more parameters comprise one or more of:
  a first set of frequency resources for the second RACH, wherein the first set of frequency resources is different from a second set of frequency resources configured for the first RACH; or
  a first set of time-domain resources for the second RACH, wherein the first set of time-domain resources is different from a second set of time-domain resources configured for the first RACH.

24. The non-transitory computer-readable medium of claim 23, wherein the reduced transmission power is associated with a preamble received target power parameter.

25. An apparatus for wireless communication, comprising:
  means for performing a network listen operation;
  means for determining, based at least in part on the network listen operation and based at least in part on a configuration of a first random access channel (RACH) associated with a macro cell, one or more parameters of a configuration of a second RACH associated with a cell provided by the apparatus,
    wherein a first RACH format configured for the first RACH is different from a second RACH format configured for the second RACH,
    wherein the one or more parameters include the second RACH format, and
    wherein the second RACH format indicates a higher quantity of repetitions than the first RACH format and a reduced transmission power;
  means for transmitting an indication of the one or more parameters of the configuration of the second RACH; and
  means for receiving a RACH communication based at least in part on repetitions, of a RACH sequence associated with the second RACH format and with the reduced transmission power, being aggregated.

26. The apparatus of claim 25, wherein the means for determining the one or more parameters of the configuration of the second RACH comprises:
  means for determining the one or more parameters to reduce one or more of collisions or interference with the first RACH.

27. The apparatus of claim 25, further comprising:
  means for determining the configuration of the first RACH based at least in part on the network listen operation.

28. The apparatus of claim 27, wherein the network listen operation comprises:
  a scan of one or more frequency ranges to detect the macro cell, and
  a determination of the configuration of the first RACH.

29. The apparatus of claim 25, wherein the one or more parameters comprise one or more of:
  a first set of frequency resources for the second RACH, wherein the first set of frequency resources is different from a second set of frequency resources configured for the first RACH; or
  a first set of time-domain resources for the second RACH, wherein the first set of time-domain resources is different from a second set of time-domain resources configured for the first RACH.

30. The apparatus of claim 29, wherein the reduced transmission power is associated with a preamble received target power parameter.

* * * * *